(12) United States Patent
Spee et al.

(10) Patent No.: US 7,714,254 B2
(45) Date of Patent: May 11, 2010

(54) AIR-CONDITIONER COMPRISING AN OPERATING DEVICE

(75) Inventors: Rainer Spee, Augsburg (DE); Michael Seifert, Augsburg (DE); Stefan Stöwe, Mering (DE)

(73) Assignee: W.E.T. Automotive Systems AG, Odelzhausen (DE)

( * ) Notice: Subject to any disclaimer, the term of this patent is extended or adjusted under 35 U.S.C. 154(b) by 731 days.

(21) Appl. No.: 10/491,948

(22) PCT Filed: Feb. 12, 2003

(86) PCT No.: PCT/DE03/00404

§ 371 (c)(1),
(2), (4) Date: Oct. 12, 2005

(87) PCT Pub. No.: WO03/068544

PCT Pub. Date: Aug. 21, 2003

(65) Prior Publication Data

US 2006/0255028 A1 Nov. 16, 2006

(30) Foreign Application Priority Data

Feb. 13, 2002 (DE) ................................ 102 06 114

(51) Int. Cl.
*B60L 1/02* (2006.01)
(52) U.S. Cl. ........................ 219/203; 219/200; 219/202; 219/497

(58) Field of Classification Search .................. 219/202, 219/229, 248, 251, 386, 497, 552, 539; 165/202, 165/43; 297/180.12
See application file for complete search history.

(56) References Cited

U.S. PATENT DOCUMENTS

| | | | | |
|---|---|---|---|---|
| 5,229,579 | A * | 7/1993 | Ingraham et al. | 219/202 |
| 5,831,244 | A * | 11/1998 | Springer, Jr. | 219/203 |
| 5,921,314 | A * | 7/1999 | Schuller et al. | 165/43 |
| 5,934,748 | A * | 8/1999 | Faust et al. | 297/180.12 |
| 6,262,400 | B1 * | 7/2001 | Urbank et al. | 219/497 |
| 6,304,803 | B1 * | 10/2001 | Dao | 701/36 |
| 6,892,807 | B2 * | 5/2005 | Fristedt et al. | 165/202 |

FOREIGN PATENT DOCUMENTS

WO      WO02/06914      *   1/2002

* cited by examiner

*Primary Examiner*—Thor S Campbell
(74) *Attorney, Agent, or Firm*—Dobrusin & Thennisch PC

(57) ABSTRACT

A climate control device (1) with a heater (5), a ventilation device (7), and with an operating device (3). The operating device includes an operating element (9) that can be switched to at least three different operating states. The operating element (9) has a first and a second electrical resistance device (11, 11", 13, 13"), the first of which is associated with the heater (5) and the second of which is associated with the ventilation device. The electrical resistance of the two resistance devices (11, 11', 13, 13') can be changed simultaneously by actuating the operating element (9).

19 Claims, 5 Drawing Sheets

AIR-CONDITIONER COMPRISING AN OPERATING DEVICE

The present invention relates to a climate control device having a heater, ventilation device and operating device including an operating element that can be switched to at least three different operating states. Climate control devices of this generic type are used for such purposes as climate control of motor vehicle seats.

BACKGROUND OF THE INVENTION

Motor vehicle seats in which ha seat heater can be adjusted to different temperature levels using a potentiometer are known. However, a heater of this nature does not provide optimum comfort.

In addition, ventilated and heated vehicle seats are known that are fully computer controlled. Such systems are expensive.

An operating device for a climate-controlled seat is described in DE 199 53 385. This device provides for an adjusting wheel with various detent positions and associated operating states. However, there is no technical description of how this association is achieved.

SUMMARY OF THE INVENTION

The present invention relates to a climate control device having a heater, ventilation device and operating device including an operating element that can be switched to at least three different operating states. The operating element has a first and second electrical resistance device, the first of which is associated with the heater and the second of which is associated with the ventilation device. The resistance of the two resistance devices can be changed simultaneously by activating the operating element. A device of this nature offers great operating convenience together with low production costs.

One embodiment of the present climate control device provides that the operating element can be mechanically switched and that the electrical resistance of the first and second resistance device can be mechanically adjusted. At least one of the resistance devices can include an on/off switch, a potentiometer, or a resistance adjustable in steps. A device according to this embodiment is robust and economical.

Another embodiment of the present climate control device provides that the ventilation device has a control device which adjusts the rotational speed of the fan as a function of the temperature of the air flowing through the fan. The heater can also include a control device to adjust the flow of current through at least one electrical heating element as a function of the temperature proximate the region of the heating element. A device according to this embodiment makes it possible to eliminate an expensive central control unit.

In another embodiment of the present climate control device, the ventilation device is deactivated when the heater is deactivated. A device according to this embodiment prevents chilling a user due to excessively cold airflow.

In a further embodiment, at least one subsection of an area to be heated is not heated when the ventilation device is switched on. A device according to this embodiment prevents overheating of regions of a heated area that are not ventilated with air. At least one of the resistance devices may also include a switch contact zone and a control resistance that is distant therefrom and electrically connected thereto.

The present climate control device may be implemented in a vehicle seat or a steering wheel or any other vehicle part which may be contacted by a user.

DESCRIPTION OF THE DRAWINGS

The description below deals with possible embodiments of the invention. These remarks are to be considered only as examples, and are made with reference to.

DESCRIPTION OF THE INVENTION

Figure 1:
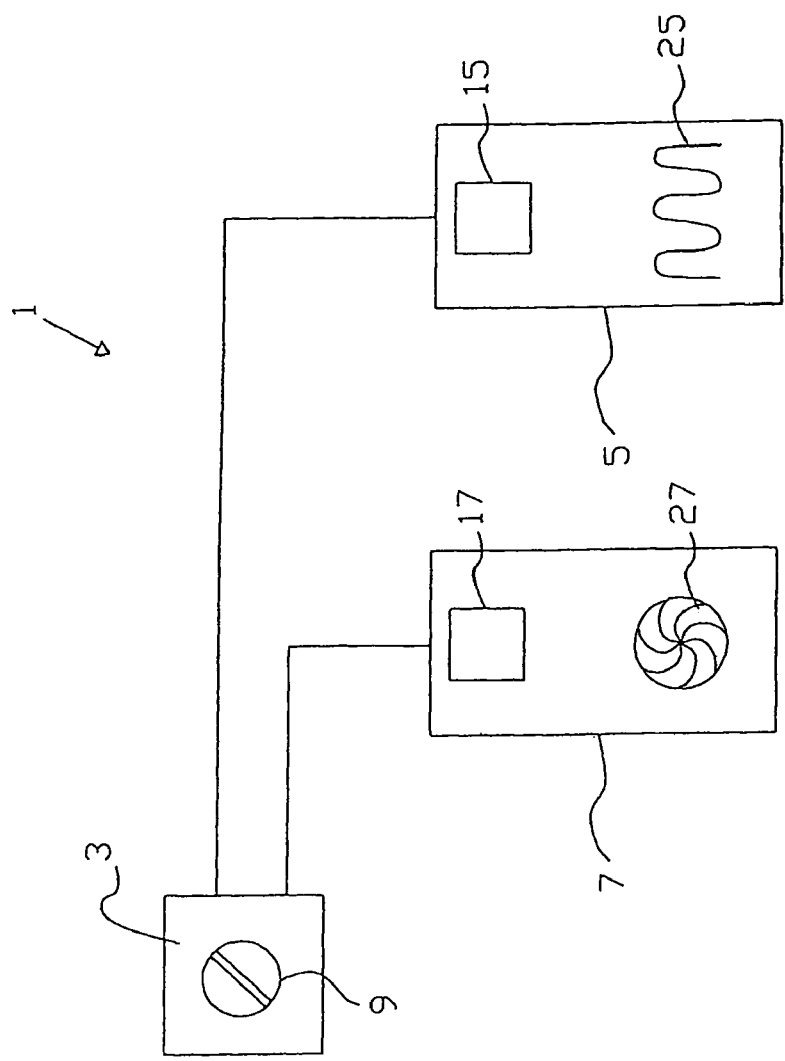
FIG. 1 Schematic view of a climate control device

FIG. 1 shows a climate control device 1. Said device has a heater 5 and a ventilation device 7. Both of these are connected to an operating device 3.

The heater 5 has an electric heating element 25, which is integrated beneath the covering of a vehicle seat, for example. In the example embodiment, it is a resistance wire made of stainless steel strands. However, carbon fiber or other known heating materials may also be used.

The heater 5 also has a control device 15. The control device 15 is electrically connected to the operating device 3. It is also connected to a temperature sensor that is not shown. The temperature sensor is preferably located in the vicinity of the heating element 25. The control device 15 is also connected to the heating element 25.

The ventilation device 7 has a fan 27 and a control device 17. The control device 17 in the present case is a "controller." The fan 27 is preferably an axial fan. However, any other desired turbine type may be used.

The control device 17 is connected to the fan 27 and also to the operating device 3. In the present example, it is additionally connected to a temperature sensor (not shown) in the air stream of the fan 27.

The operating element 9 has an operating device 3.

Figure 2:
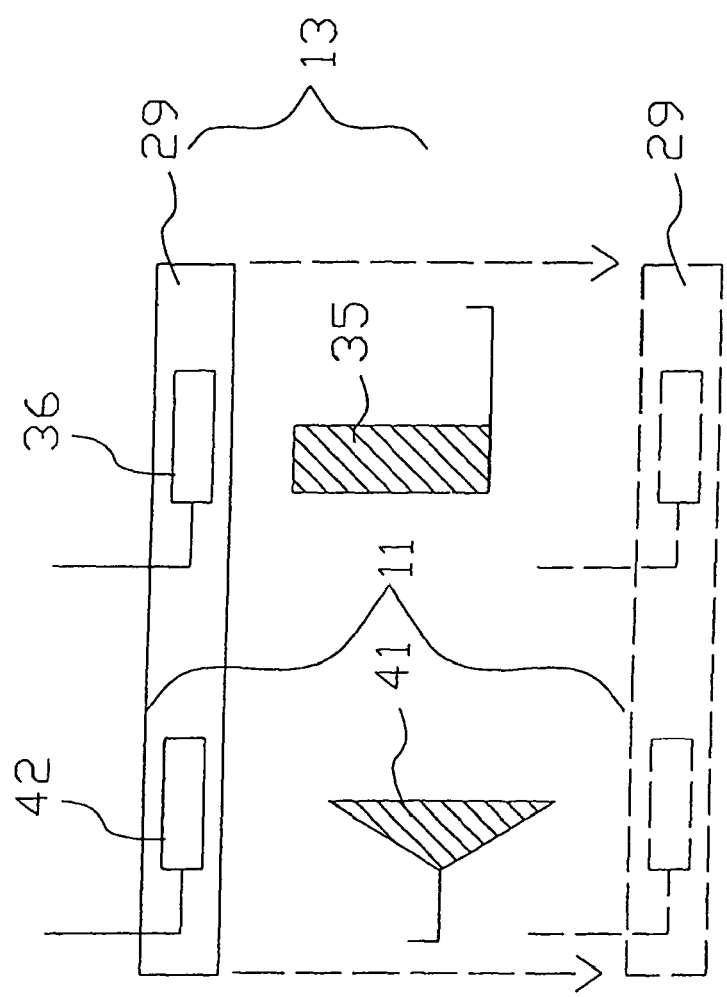
FIG. 2 Top view of a first embodiment of an operating element with two resistance devices FIG. 3 Top view of a second embodiment of an operating element with two resistance devices FIG. 4 Top view of a seat shown from above FIG. 5 Top view of a third embodiment of an operating element

FIG. 2 shows details of a first embodiment of an operating device 3. It has an operating element 9. Two resistance devices 11, 13 are associated therewith.

Resistance device is defined as a functional unit whose electrical resistance is significantly higher than the resistance of adjacent electrical conductors or is appropriately adjustable. This includes an infinite resistance or switch.

The resistance device 11 has a contact pole 42 and a resistance 41 in the form of a triangular, electrically conductive contact area. The resistance device 13 has a second contact pole 36 and a contact zone 35 in the form of a rectangular, electrically conductive contact surface.

The resistance device 11 is associated with the heater 5. The resistance device 13 is associated with the ventilation device 7. The two resistance devices 11, 13 are mechanically connected to one another by a jumper element 29 at that their two contact poles 36 and 42 and are coupled to the operating element 9.

The climate control device functions as follows: In a neutral position of the operating element 9, both the heater 5 and the ventilation device 7 are switched off. This is because the contact poles 36 and 42 do not touch the resistance 41 or the trace 35.

When the operating element 9 is actuated, the jumper element 29 with the contact poles 36, 42 is moved over the resistance 41 or the trace 35. In the case of the resistance 11, the electrical resistance is changed by the change in contact area between the contact pole 42 and the resistance 41 and/or the change in the remaining resistance length. In the case of the resistance 13, there are regions in which the contact pole 36 contacts the trace 35 and regions in which no contact occurs. Thus, different resistance values can be set at the operating device 9 by means of the jumper element 29 at the resistance devices 11, 13.

The control devices 15, 17 of the ventilation device 7 and heater 5 automatically adjust the operating parameters as a function of these resistances.

The control device 17 of the ventilation device 7 determines from the resistance value of the resistance device 13 whether operation of the fan 27 is desired or not. In addition, the control device 17 receives, from the temperature sensor that is not shown, the actual temperature of the air flowing through the fan 27. Using the measured temperature, the control device 17 determines the rotational speed of the fan 27. The parameters needed for this purpose are stored in the control device 17. At high air temperatures, the fan speed will tend to be high, and at low air temperatures it will tend to be low.

The heater 5 receives the resistance value of the resistance device 13 of the operating element 9. The control device 15 of the heating element 5 determines the desired set temperature of the heating element 25 from this resistance value. The control device 15 determines the actual temperature in the vicinity of the heating element 25 by means of the sensor that is not shown. The control device 15 then automatically monitors the temperature of the heating element 25. To this end, it appropriately controls the amount of current passing through the heating element 25.

Figure 3:
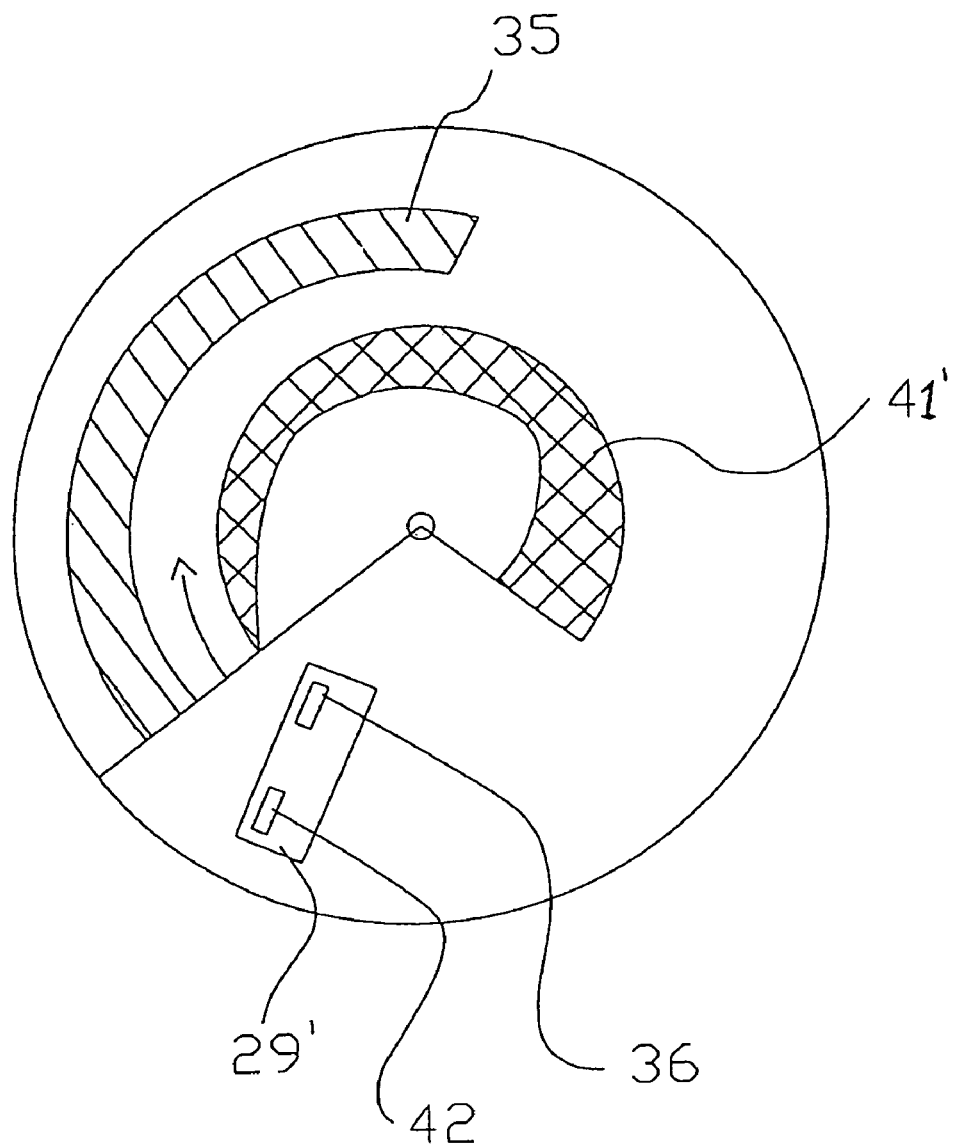

FIG. 3 shows a second embodiment of the resistance devices 11, 13. In this embodiment, a first and a second electrical resistance 35', 41' are arranged concentric to one another. A jumper element 29' is rotatably supported in the center. Two contact poles 42, 36 are likewise provided on the jumper element 29'. Rotation of the jumper element 29' moves the contact poles relative to the resistances 35', 41'.

This embodiment also permits simple mechanical change of two resistance values simultaneously.

Figure 4:
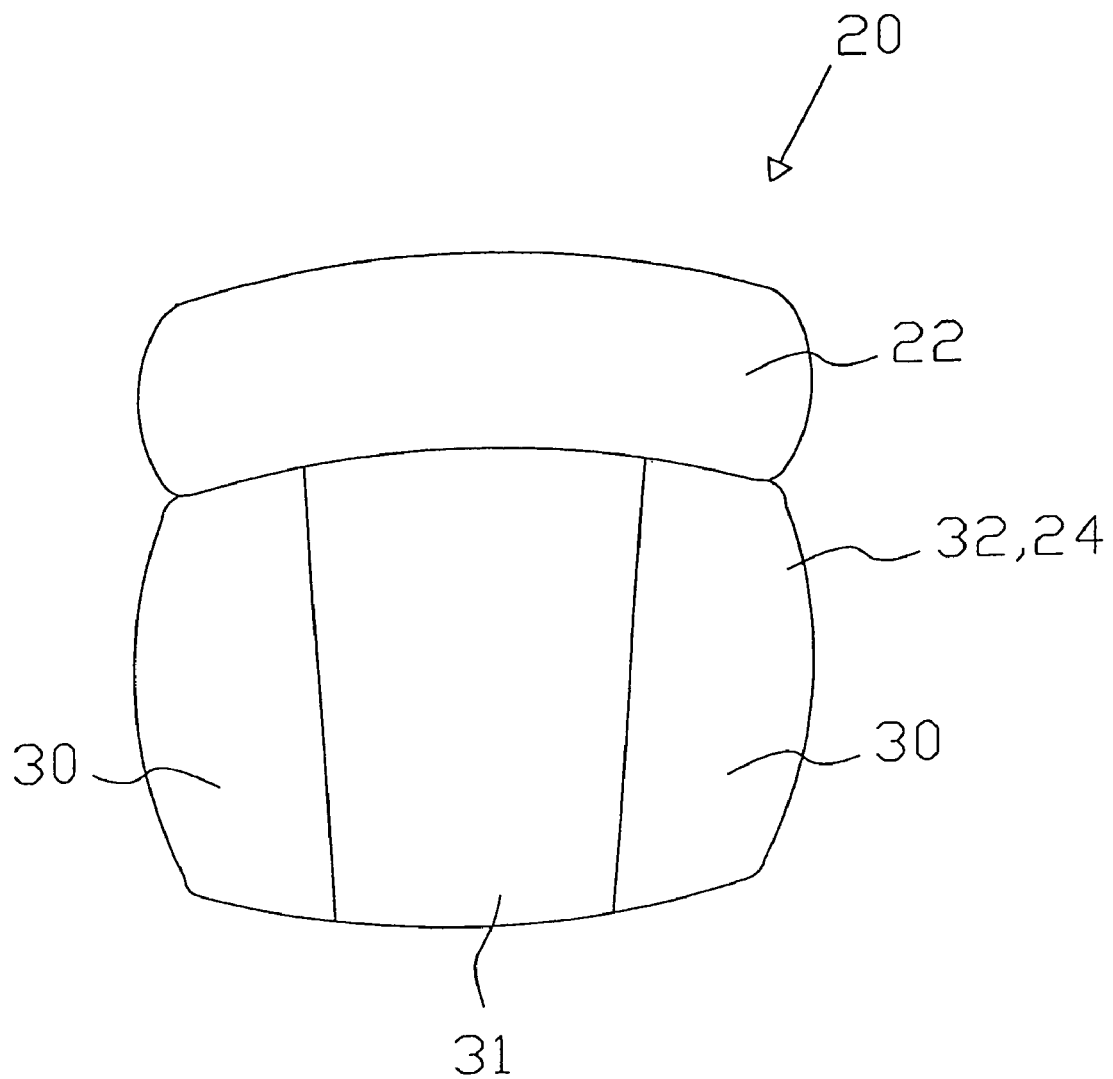

FIG. 4 shows a motor vehicle seat 20 from above. It has a backrest 22 and a seat 24. The seat 24 has an area 32 to be heated, which in the example embodiment corresponds to the full area of the seat 24.

The area 32 to be heated has a center region 31. This region can be heated electrically and air can simultaneously flow through it. The heated area 32 also has subsections 30 that can only be heated without being ventilated.

As a result of the ventilation, the center region 31 will be colder during operation than the unventilated subsections 30. Hence, setting the temperature of the center region 31 to a comfortable level will lead to overheating of the unventilated subsections 30. In a preferred embodiment, the control device 15 of the heater 5 thus receives a signal that indicates the operating state of the ventilation device 5. If the fan 27 is switched on, the control device 15 switches off the subsections 30.

Figure 5:
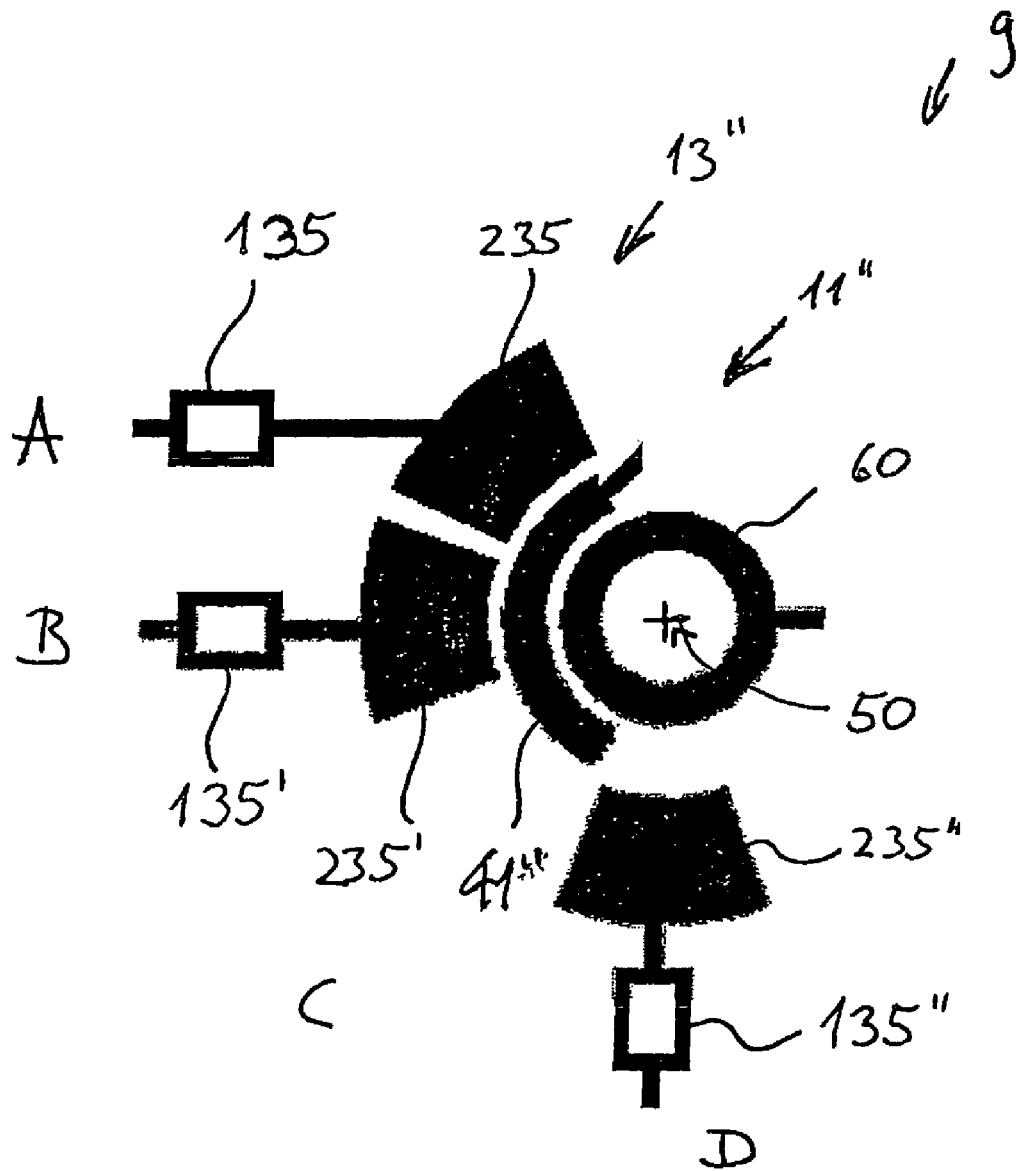

The embodiment in FIG. 5 exhibits a flat, ring-shaped supply contact zone 60. This zone constitutes an electrical pole of the operating element 9. An electrical supply potential is always present at this pole.

Arranged concentrically at a distance from and outside of the supply contact zone is a heater resistance zone 41". It is semicircular. It is made of a conductive material, either in the form of a resistance, as here, or in the form of a simple trace, as desired.

Also arranged concentrically at a distance outside the heater resistance zone 41" are switch contact zones 235, 235', 235" in the form of arcs. Each of them is electrically connected to a control resistance 135, 135', 135". Each of said control resistances 135, 135', 135' is associated with an operating state of the ventilation device 7.

The heater resistance zone 41" and the switch contact zones 235, 235', 235" each form electrical antipoles to the supply contact zone 60.

This embodiment also has a jumper element, although for clarity's sake it is not shown. It is rotatably supported about the center point 50 of the supply contact zone 60. It has three contact poles, which are associated with the supply contact zone 60, the heater resistance zone 41" and the switch contact zones 235, 235', 235", and which contact them depending on the operating state.

In an unheated operating state D, the jumper element only contacts the switch contact zone 235". The effect of this is that the ventilation device 7 is operated without heat at an operating level appropriate for the control resistance 135".

Pure heater operation is obtained in operating state C. Here, the jumper element contacts only the heater resistance zone 41".

In another operating state B, contact is made through the switch contact zone 235' with the control resistance 135' associated with the fan 27. At the same time, contact is made with the heater resistance zone 41". As a result, the heater and ventilation device are operated simultaneously.

In a fourth operating state A, contact is made with another control resistance 135 through another switch contact zone 235. At the same time, contact is made with the heater resistance zone 41" at a resistance value that is changed with respect to the operating state C. This results in changed heating and ventilating behavior as compared to operating state C.

Contact zones and heater resistors—as provided in this embodiment for switching the ventilation device 7—may also be used to switch the heater 5 instead of the heater resistance zone 41".

The invention claimed is:

1. A climate control device comprising:
    a heater;
    a ventilation device; and
    an operating device having an operating element, the operating device being operatively connected to the heater and ventilation device, the operating element including first and second electrical resistance devices, the first resistance device being associated with the heater and the second resistance device being associated with the ventilation device, wherein the electrical resistance of the first and second resistance devices can be changed simultaneously by actuating the operating element and wherein the first and second electrical resistance devices each include a switch contact zone and a control resistance arranged at a distance therefrom and electrically connected thereto.

2. A device according to claim 1 wherein the electrical resistance of the first or second resistance devices can be mechanically adjusted.

3. A device according to claim 1 wherein at least one of the first or second resistance devices is selected from the group consisting of an on/off switch, a potentiometer, and a stepwise adjustable resistor.

4. A device according to claim 1 wherein control settings of the operating element are incrementally or continuously adjustable.

5. A device according to claim 1 wherein the ventilation device comprises a fan and a control device which adjusts a speed of the fan as a function of the air temperature flowing through the fan.

6. A device according to claim 1 wherein the heater comprises an electrical heating element and a control device which adjusts a flow of current through the heating element as a function of the temperature proximate the region of the heating element.

7. A device according to claim 5 wherein the heater comprises an electrical heating element and a control device which adjusts a flow of current through the heating element as a function of the temperature proximate the region of the heating element.

8. A device according to claim 1 wherein the ventilation device and heater are configured such that the ventilation device is deactivated when the heater is deactivated.

9. A device according to claim 1 wherein the heater is arranged across an area to be heated and at least one subsection of the area is not heated when the ventilation device is activated.

10. A device according to claim 1 wherein the heater is arranged in a vehicle seat or a steering wheel.

11. A climate control device comprising:
a heater
a ventilation device; and
an operating device having an operating element, the operating device being operatively connected to the heater and ventilation device, the operating element including first and second electrical resistance devices, the first resistance device being associated with the heater and the second resistance device being associated with the ventilation device, each of the electrical resistance devices including a defined contact area each area having an associated contact pole, the contact poles being arranged on a jumper element such that the electrical resistance of the first and second resistance devices can be changed simultaneously by actuating the jumper element, and wherein the contact areas include associated contact resistances arranged at a distance therefrom and electrically connected thereto.

12. A device according to claim 11 wherein the ventilation device comprises a fan and a control device which adjusts a speed of the fan as a function of the air temperature flowing through the fan.

13. A device according to claim 11 wherein the heater comprises an electrical heating element and a control device which adjusts a flow of current through the heating element as a function of the temperature proximate the region of the heating element.

14. A device according to claim 12 wherein the heater comprises an electrical heating element and a control device which adjusts a flow of current through the heating element as a function of the temperature proximate the region of the heating element.

15. A device according to claim 12 wherein the contact areas are semi-circular in shape.

16. A vehicle seat including at least one seat cushion and a climate control device comprising:
a heater arranged across an area of the seat cushion;
a ventilation device arranged within at least a portion of the seat cushion; and
an operating device having an operating element, the operating device being operatively connected to the heater and ventilation device, the operating element including first and second electrical resistance devices, the first resistance device being associated with the heater and the second resistance device being associated with the ventilation device, wherein the electrical resistance of the first and second resistance devices can be changed simultaneously by actuating the operating element and wherein at least one of the first and second electrical resistance devices includes a switch contact zone and a control resistance arranged at a distance therefrom and electrically connected thereto.

17. A device according to claim 16 wherein the ventilation device comprises a fan and a control device which adjusts a speed of the fan as a function of the air temperature flowing through the fan.

18. A device according to claim 16 wherein the heater comprises an electrical heating element and a control device which adjusts a flow of current through the heating element as a function of the temperature proximate the region of the heating element.

19. A device according to claim 16 wherein the first and second electrical resistance devices are configured such that at least one subsection of the heated seat cushion area is not heated when the ventilation device is activated.

* * * * *